July 14, 1936.  G. H. C. CORNER  2,047,925
SLIDE FASTENER
Original Filed Oct. 15, 1932
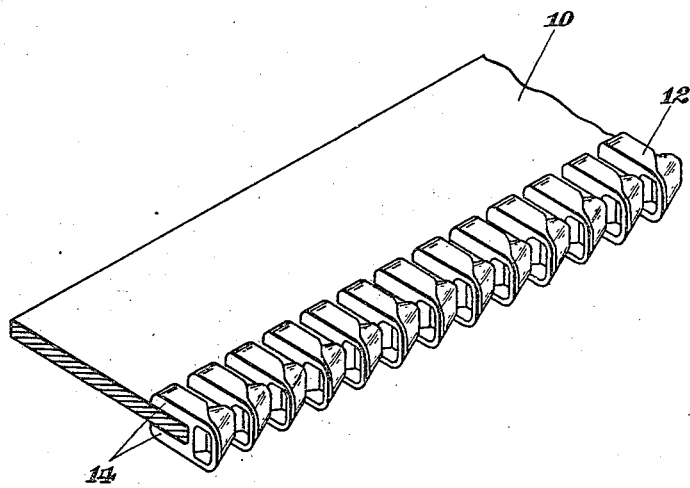
INVENTOR.
George H. C. Corner
BY Kelley + Chisholm
ATTORNEYS.

Patented July 14, 1936

2,047,925

UNITED STATES PATENT OFFICE 2,047,925

SLIDE FASTENER

George H. C. Corner, Birmingham, England, assignor to Hookless Fastener Company, a corporation of Pennsylvania Original application October 15, 1932, Serial No. 637,984, now Patent No. 1,920,138, dated July 25, 1933. Divided and this application July 5, 1933, Serial No. 679,039. In Great Britain October 17, 1931

2 Claims. (Cl. 24—205)

This invention relates to separable interlocking fasteners in which two rows of fastener members are attached to flexible supports and are so constructed that the members of one row interlock with those of the other row. The invention provides a new separable interlocking fastener in which the fastener members are of non-metallic material which is light-weight, of any desired color, attractive in appearance, and smooth and otherwise pleasing to the touch due to its low heat conductivity. This application is a division of my application Ser. No. 637,984, filed October 15, 1932, now Patent 1,920,138, dated July 25, 1933.

The principal objects of the invention are to provide an interlocking fastener of this type which will be strong and durable, highly flexible without opening up, and in which the fastener members are very firmly and neatly secured to their flexible supports.

Other objects and advantages of the invention will be apparent from the accompanying description and drawing, the single figure of which is a perspective view of one form of fastener stringer constructed according to my invention.

Separable interlocking fasteners have heretofore been made of metal but the methods and apparatus for their manufacture are unsuited to making fasteners of non-metallic materials because non-metallic materials can not be successfully formed and bent to clamp them on flexible supports by such apparatus. While it has heretofore been proposed to make fasteners of artificial resins by casting the fastener members directly on the tape, such fasteners have not been entirely successful because of the difficulty and expense in their manufacture.

According to the present invention, fastener members are produced from a suitable non-metallic material and are then firmly attached to the tape by sticking, for example, cementing, gluing or by temporarily softening the material of the fastener member sufficiently to make it adhere to the fabric. The term "sticking" as used herein and in the appended claims, means causing the elements to adhere to the tape by the use of cement, glue or the like, or by softening surfaces of the elements, and is intended to distinguish from affixing the elements to the tape by mechanical gripping or by casting them directly upon the tape. Likewise the term "sticking material" is used to define the material in the completed article which bonds or sticks the fastener member to the supporting strip. It may be cement, glue or the material of the fastener element which has been softened by solvent and later dried.

The non-metallic material used in making the fastener members may be selected from a wide range of plastics; e. g., cellulose ester or ether material, resinous polymerized unsaturated organic compounds, phenol-aldehyde resins, urea- or thiourea-aldehyde resins, polyhydric-alcohol-polybasic-acid resins, or other artificial resins.

The fastener members may be shaped or formed by molding, die-casting, stamping or other forming process from the non-metallic material. They may be formed singly or in rows with proper spacing. Preferably I group the individual formed members with the required accurate and uniform spacing before inserting the tapes. The edge of the fastener tape may be easily inserted into the slotted bases of the fastener elements because the sides of the slot are parallel.

The sticking of the fastener members on the fabric tape may be effected by softening the bifurcations or the inside portions thereof by heat, solvents, or other means so that they become stuck to the fabric tape, when the members are applied on the tape. The tape may be saturated with a suitable solvent which softens the inner surfaces of the fastener members when applied to the saturated tape. When the solvent afterwards evaporates, the fastener members are firmly stuck to the tape by a dried solution of the fastener member material. In the case of insoluble materials, the tape may be treated with a suitable adhesive or cementing material which may adhere both to the fabric and the material of the elements when applied to the tape. It is important in the finished fastener that the fabric tape between the fastener members remain flexible in order to permit easy operation of the fastener. The fastener members are held from coming off the tape solely by being adhesively secured thereto, since the slot in the bifurcated base portion has parallel sides.

When a resin is employed which is capable of being hardened, it is possible to effect hardening at any convenient stage in the process, e. g., before fashioning the fastener members or after fashioning and before fixing on the fabric tape or after they have been fixed on the fabric tape.

Referring to the single figure of the drawing, the fabric tape is indicated by the numeral 10 and the fastener members are shown in uniformly and closely spaced relation on the edge of the tape. The interlocking or projecting ends of the elements are indicated at 12 and the bifurcations or prongs by the numeral 14.

While I have shown and described in this application one embodiment which my invention may assume in practice, it will be understood that this embodiment is merely for the purpose of illustration and description and that various other forms may be devised within the scope of my invention as defined in the appended claims.

What I claim as my invention is:

1. A separable interlocking fastener of the class described comprising a pair of flexible strips, cooperating series of fastener members arranged in uniformly and closely spaced relation along the adjacent edges of the strips, said members consisting of plastic material in a hard state and each fastener member having an interlocking head portion projecting from the edge of the strip and a bifurcated base portion whose bifurcations are separated by a parallel sided slot which receives the edge of the tape, the width of said slots being substantially equal to the thickness of the edge portions of the strips, and said members being held on the edge of the tape solely by adhesive means between said parallel sides of said slot and said tape, there being a well-defined clean cut line of demarcation between said plastic material of the fastener members and said flexible strip whereby the fabric tape between the fastener members has the maximum flexibility.

2. A separable interlocking fastener of the class described comprising a pair of flexible strips, cooperating series of fastener members arranged in uniformly and closely spaced relation along the adjacent edges of the strips, said members consisting of plastic material in a hard state and each fastener member having an interlocking head portion projecting from the edge of the strip and a slot which receives the edge of the tape and which is at least as wide at its entrance as at any other portion, the sides of the slot contacting at all points with the strip and said members being held on the edge of the tape solely by adhesive means between the sides of said slot and said tape, there being a well-defined clean cut line of demarcation between said plastic material of the fastener members and said flexible strip whereby the fabric tape between the fastener members has the maximum flexibility.

GEORGE H. C. CORNER.